(12) United States Patent
Wang et al.

(10) Patent No.: US 12,326,196 B2
(45) Date of Patent: Jun. 10, 2025

(54) DRIVING DEVICE AND CONTROL VALVE

(71) Applicant: ZHEJIANG SANHUA AUTOMOTIVE COMPONENTS CO., LTD., Zhejiang (CN)

(72) Inventors: Lixin Wang, Zhejiang (CN); Yongpin Lu, Zhejiang (CN); Haijun Zhu, Zhejiang (CN); Long Lin, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 34 days.

(21) Appl. No.: 18/573,456

(22) PCT Filed: Jun. 23, 2022

(86) PCT No.: PCT/CN2022/100712
§ 371 (c)(1),
(2) Date: Dec. 22, 2023

(87) PCT Pub. No.: WO2022/268156
PCT Pub. Date: Dec. 29, 2022

(65) Prior Publication Data
US 2024/0288081 A1    Aug. 29, 2024

(30) Foreign Application Priority Data
Jun. 25, 2021   (CN) .......................... 202110712876.9

(51) Int. Cl.
*F16K 11/22*    (2006.01)
*F16K 11/076*   (2006.01)
(Continued)

(52) U.S. Cl.
CPC ............ *F16K 11/22* (2013.01); *F16K 11/076* (2013.01); *F16K 11/085* (2013.01);
(Continued)

(58) Field of Classification Search
CPC ...... F16K 11/22; F16K 11/076; F16K 11/085; F16K 11/0873; F16K 31/041; F16K 31/535
See application file for complete search history.

(56) References Cited

U.S. PATENT DOCUMENTS 4,132,936 A * 1/1979 Fujiwara ............... F16K 31/041
                                                          318/482
4,749,004 A * 6/1988 Peash ...................... F16K 11/22
                                                           137/865
(Continued)

FOREIGN PATENT DOCUMENTS

CN          107027735 A      8/2017
CN          111306763 A      6/2020
(Continued)

OTHER PUBLICATIONS

International Search Report for PCT/CN2022/100712 mailed Sep. 8, 2022, ISA/CN.
(Continued)

*Primary Examiner* — Umashankar Venkatesan
(74) *Attorney, Agent, or Firm* — Yue (Robert) Xu; Apex Attorneys at Law, LLP

(57) ABSTRACT

A driving device and a control valve are provided. The driving device comprises a first driving assembly and a second driving assembly, the first driving assembly comprises a first motor, the second driving assembly comprises a second motor, the first motor comprises a first body and a first power supply terminal, the second motor comprises a second body and a second power supply terminal, a plurality of wire segments are in corresponding electrical connection to the first and second power supply terminals, each wire segment comprises a wiring segment, projection is performed toward a bottom wall portion along the height direction of the driving device, the orthographic projections (Continued)

of at least part of the wiring segments at least partially overlap with the orthographic projections of the bodies, and the width of a gap between the two bodies is less than a maximum width between the two wiring segments.

17 Claims, 7 Drawing Sheets

(51) Int. Cl.
| | | |
|---|---|---|
| F16K 11/085 | (2006.01) | |
| F16K 11/087 | (2006.01) | |
| F16K 31/04 | (2006.01) | |
| F16K 31/53 | (2006.01) | |

(52) U.S. Cl.
CPC ........ *F16K 11/0873* (2013.01); *F16K 31/041* (2013.01); *F16K 31/535* (2013.01)

(56) References Cited

U.S. PATENT DOCUMENTS

| | | | | |
|---|---|---|---|---|
| 5,234,020 A * | 8/1993 | Orlandi | ................... | F16K 11/22 |
| | | | | 137/454.2 |
| 5,320,139 A * | 6/1994 | Paul | ..................... | G01N 1/31 |
| | | | | 137/565.33 |
| 5,417,083 A * | 5/1995 | Eber | ..................... | F16K 31/041 |
| | | | | 251/285 |
| 6,028,384 A | 2/2000 | Billman et al. | | |
| 6,257,279 B1 * | 7/2001 | Peltz | ..................... | F16K 31/041 |
| | | | | 137/625 |
| 6,926,252 B2 * | 8/2005 | Hildebrandt | .......... | F02D 9/1065 |
| | | | | 251/305 |
| 7,077,163 B2 * | 7/2006 | Schwarz | ................. | F16K 11/22 |
| | | | | 137/883 |
| 8,499,892 B2 * | 8/2013 | Cavarello | ........... | F16K 11/0856 |
| | | | | 184/6.28 |
| 10,384,151 B2 * | 8/2019 | Liu | ........................ | G01N 30/20 |
| 10,550,947 B2 * | 2/2020 | Koyama | ................... | F16K 7/16 |
| 10,870,920 B2 * | 12/2020 | Okura | ................. | C23C 16/45587 |
| 10,927,962 B1 * | 2/2021 | Hurst | .................... | F16K 31/047 |
| 11,300,222 B1 * | 4/2022 | Higgins | .............. | F16K 11/0712 |
| 11,535,109 B2 * | 12/2022 | Bellato | ............ | B60K 15/03006 |
| 11,635,250 B2 * | 4/2023 | Giacomini | .......... | F16K 31/0624 |
| | | | | 137/861 |
| 12,025,240 B2 * | 7/2024 | Schneider | ........... | F16K 31/0624 |
| 2006/0175565 A1 * | 8/2006 | Nungesser | ........... | F16K 27/029 |
| | | | | 251/129.11 |
| 2020/0279595 A1 | 9/2020 | Oikawa et al. | | |
| 2021/0180711 A1 * | 6/2021 | Van Riel | ............... | F16K 5/0471 |
| 2024/0288080 A1 * | 8/2024 | Wang | ..................... | F16K 11/20 |
| 2024/0288081 A1 * | 8/2024 | Wang | ..................... | F16K 31/535 |

FOREIGN PATENT DOCUMENTS

| | | |
|---|---|---|
| CN | 112542121 A | 3/2021 |
| JP | H08238801 A | 9/1996 |
| JP | 2014014238 A | 1/2014 |
| JP | 2014027167 A | 2/2014 |
| JP | 2016199136 A | 12/2016 |

OTHER PUBLICATIONS

The Japanese 1st Office Action issued on Nov. 19, 2024 for JP2023-578937.

* cited by examiner

DRIVING DEVICE AND CONTROL VALVE

This disclosure is a national phase application of PCT international patent application PCT/CN2022/100712, filed on Jun. 23, 2022 which claims the priority to Chinese Patent Application No. 202110712876.9, titled "DRIVING DEVICE AND CONTROL VALVE", filed with the China National Intellectual Property Administration on Jun. 25, 2021, the entire disclosure of which are incorporated herein by reference.

FIELD

This disclosure relates to the technical field of fluid control, in particular to a driving device and a control valve.

BACKGROUND

Usually, a valve core of a control valve is rotated through being driven by a driving device to realize fluid control of the control valve on a multiple flow paths. When the provision of the driving device is unreasonable, it will result in a larger structure of the driving device and occupy more space, which is not beneficial for the miniaturization of the control valve.

SUMMARY

An object of this disclosure is to provide a driving device and a control valve, enabling the driving device to have a smaller size, reducing the space occupied by the driving device, and facilitating the miniaturization of the control valve.

On one hand, an embodiment of the present disclosure provides a driving device, wherein the driving device includes a housing and a driving assembly, the driving assembly includes a first driving assembly and a second driving assembly. The driving device has an accommodating cavity, the housing includes a bottom wall portion, and the bottom wall portion is a wall portion or at least a part of the wall portion of the accommodating cavity. At least part of the first driving assembly and at least part of the second driving assembly are arranged in the accommodating cavity. A gap is provided between the first driving assembly and the second driving assembly, and the first driving assembly and the second driving assembly are arranged along the length direction of the driving device.

The first driving assembly includes a first motor, the first motor has a first body and a first power supply terminal located at a first end of the first body. The second driving assembly includes a second motor, the second motor has a second body and a second power supply terminal located at a first end of the second body.

The driving device further includes multiple wire segments that are electrically connected to the first power supply terminal and the second power supply terminal correspondingly, each wire segment includes a wiring segment, and the extension direction of at least part of the wiring segment intersects with the length direction of the driving device.

Among the multiple wire segments, as making projection toward the bottom wall portion along the height direction of the driving device, the orthographic projections of at least some of the wiring segments are at least partially overlapped with the orthographic projection of the first body and/or the orthographic projection of the second body.

On the other hand, a control valve is provided according to the embodiment of the disclosure, the control valve includes the driving device as described in any of the above embodiments, a valve body, a first valve core and a second valve core. The valve body includes a first chamber and a second chamber that are in communication with each other, at least part of the first valve core is located in the first chamber, and at least part of the second valve core is located in the second chamber. The first valve core is in transmission connection with the first driving assembly, and the second valve core is in transmission connection with the second driving assembly.

A driving device and a control valve are provided according to the embodiment of the present disclosure, the driving device includes a first motor and a second motor that are provided at an interval, and a first end of the first motor and a first end of the second motor are provided adjacent to each other, so that a first power supply terminal located at the first end of the first motor and a second power supply terminal located at the first end of the second motor are provided adjacent to each other, facilitating centralized wiring of multiple wire segments. As making projection toward the bottom wall portion along the height direction of the driving device, the orthographic projections of at least some of the wiring segments at least partially overlap with the orthographic projection of the first body and/or the orthographic projection of the second body. Compared with the case of arranging all the wiring segments in a gap between the first body and the second body, according to the embodiment of the present disclosure, the number of wiring segments arranged in the gap between the first body and the second body is reduced, the distance between the first body and the second body can be reduced, and the size of the driving device in the length direction can be further reduced. When the driving device is applied to the control valve, it can further reduce the size of the control valve, facilitating the miniaturization of the control valve.

DETAILED DESCRIPTION OF THE EMBODIMENTS

Figure 1:
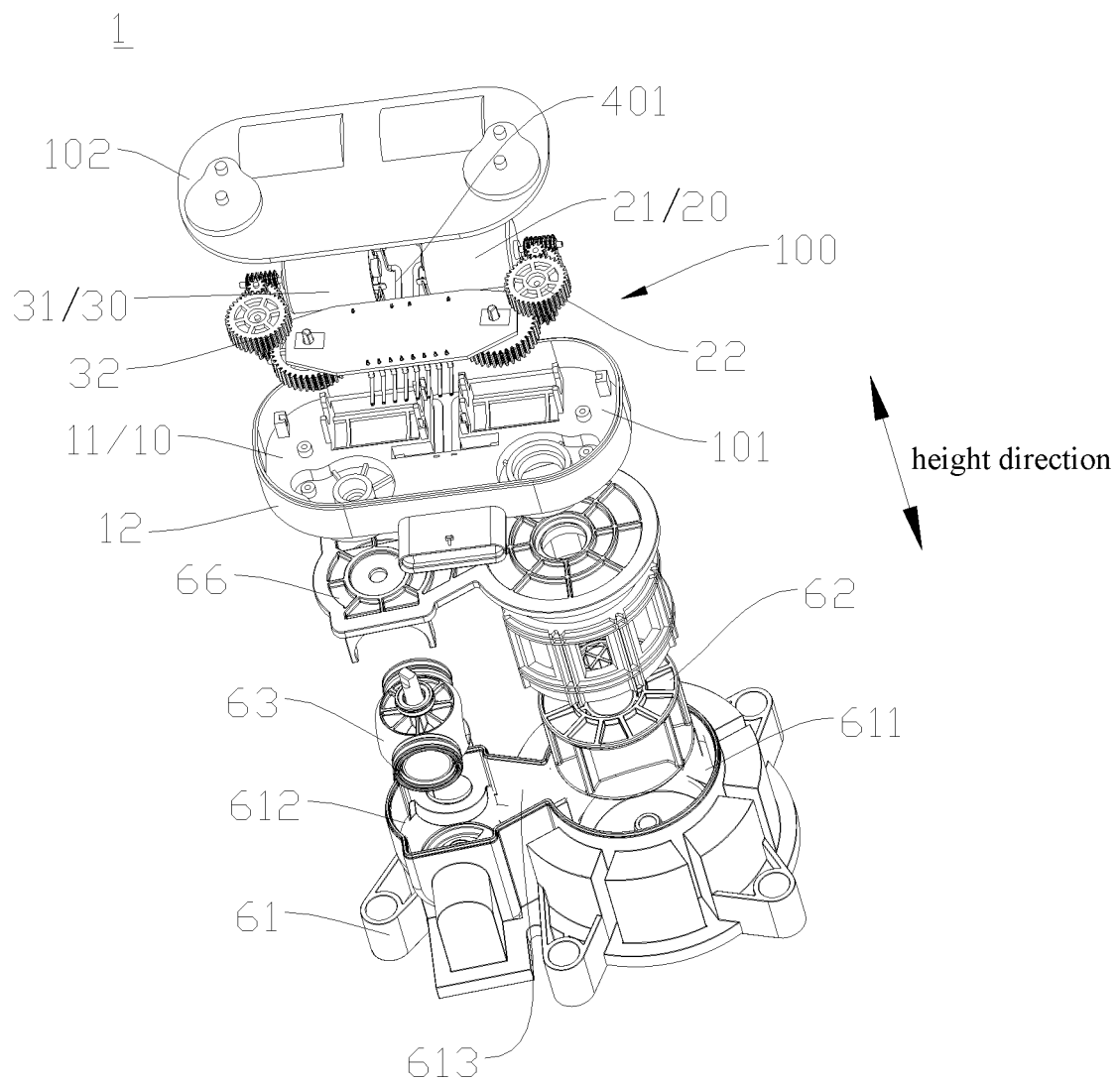
FIG. 1 is a schematic view of an exploded structure of a control valve provided according to one embodiment of the present disclosure.
Figure 2:
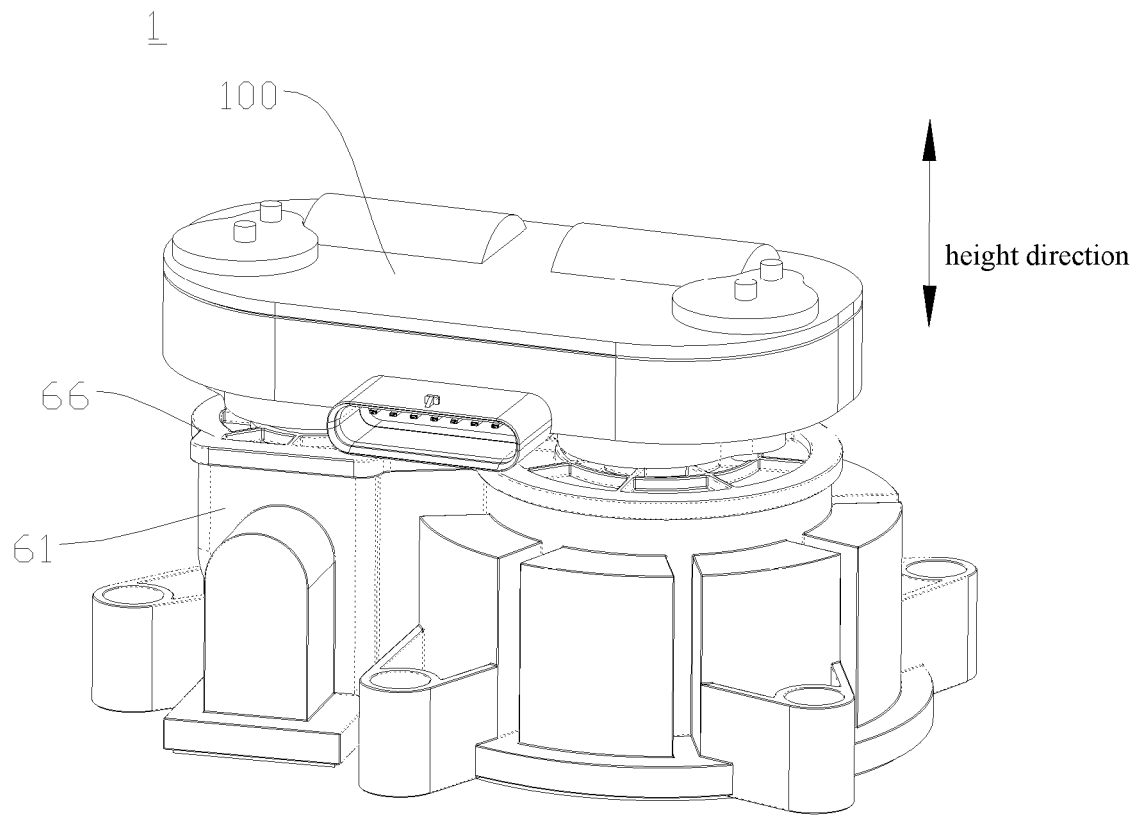
FIG. 2 is a schematic view of a three-dimensional structure of the control valve shown in FIG. 1.
Figure 3:
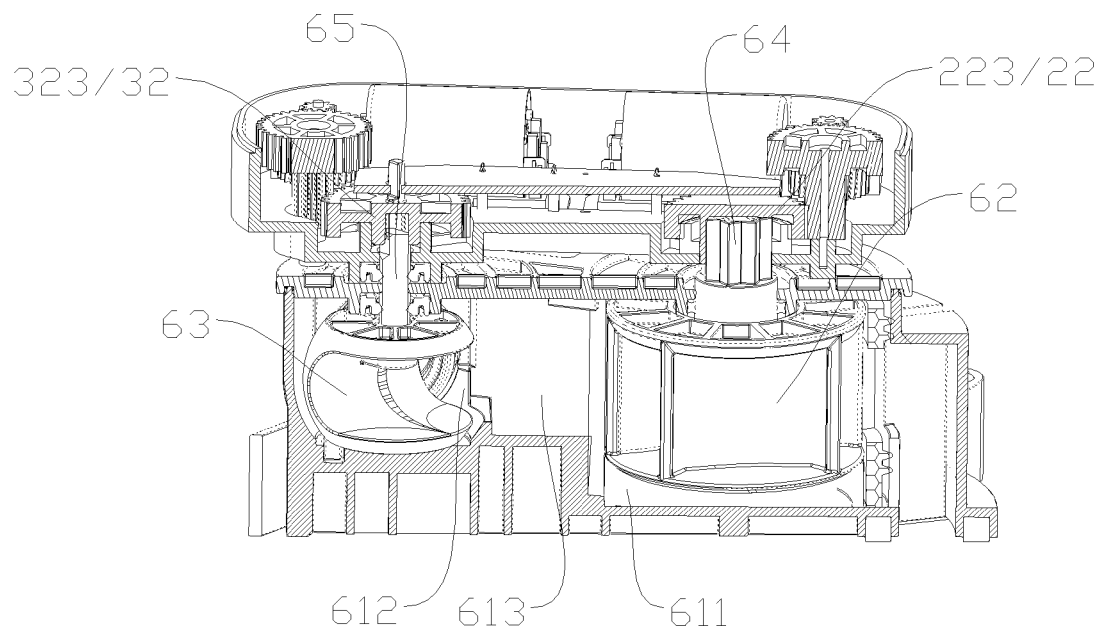
FIG. 3 is a partial cross-sectional schematic view of the control valve shown in FIG. 2.
Figure 4:
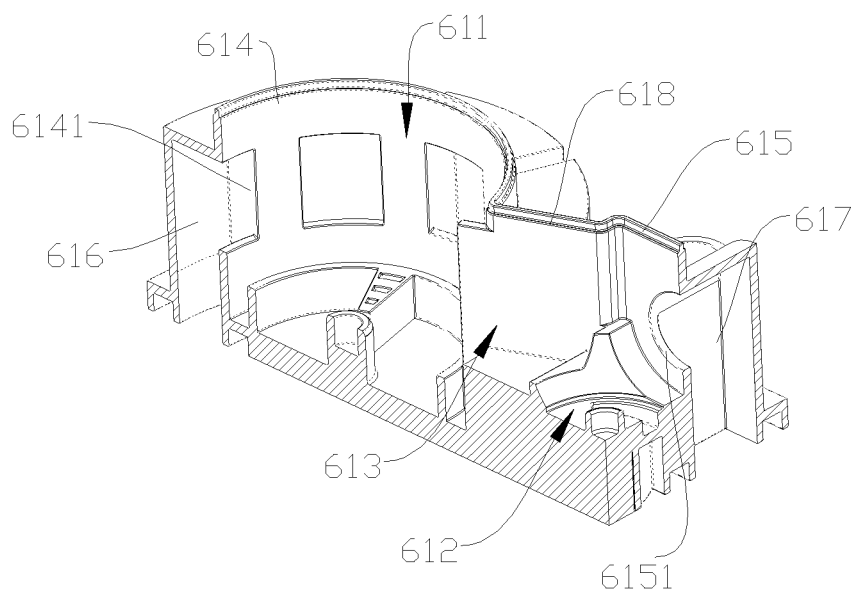
FIG. 4 is a schematic structural view of a valve body provided according to one embodiment of the present disclosure.

The features and exemplary embodiments of various aspects of the present disclosure will be described in detail below. To make the objects, technical solutions and advantages of the present disclosure more clear and apparent, the present disclosure will be further described in detail in conjunction with the accompanying drawings and the specific embodiments. Moreover, relational terms such as "first" and "second" etc. are only used to distinguish one component from another component having the same name, and do not necessarily require or imply any such actual relationship or order between these components.

As shown in FIG. 1 to FIG. 4, an embodiment of the present disclosure provides a control valve 1, which includes a driving device 100, an upper cover 66, a valve body 61, a first valve core 62 and a second valve core 63, wherein at least part of the first valve core 62 and at least part of the second valve core 63 are located in the valve body 61, and both the first valve core 62 and the second valve core 63 can be driven to rotate independently, so that different valve ports of the control valve 1 are in communication with each other by communication cavities of the two valve cores to perform a control function of the control valve 1 to the fluid. Further, at least part of the first valve core 62 and at least part of the second valve core 63 are located between the upper cover 66 and the valve body 61, and the upper cover 66 and the valve body 61 can be sealed to prevent the leakage of fluid. The driving device 100 is located on one side of the upper cover 66 away from the valve body 61. The driving device 100 can drive the first valve core 62 and the second valve core 63 to rotate.

With further reference to FIG. 1 to FIG. 4, the control valve 1 has a first chamber 611, a second chamber 612 and a communication hole 613 that is in communication with the first chamber 611 and the second chamber 612. The communication hole 613 can realize the mutual exchange of fluids between the first chamber 611 and the second chamber 612. The arrangement orientation of the first chamber 611 and the second chamber 612 intersects with the height direction of the control valve 1. For example, in FIG. 1, the arrangement orientation of the first chamber 611 and the second chamber 612 is perpendicular to the height direction of the control valve 1. In conjunction with FIG. 4, the valve body 61 includes a first side wall portion 614 and a second side wall portion 615, the first side wall portion 614 and the second side wall portion 615 are fixedly connected and sealed, or they are integrally formed. The first side wall portion 614 is a peripheral wall or at least a part of the peripheral wall of the first chamber 611, and the second side wall portion 615 is a peripheral wall or at least a part of the peripheral wall of the second chamber 612. Further referring to FIG. 4, the valve body 61 may further include a connecting wall portion 618 that connects the first side wall portion 614 and the second side wall portion 615, the connecting wall portion 618 is located between the first side wall portion 614 and the second side wall portion 615. The connecting wall portion 618 is a peripheral wall or at least a part of the peripheral wall of the communication hole 613. The first side wall portion 614, the second side wall portion 615 and the connecting wall portion 618 can be integrally formed. In order to realize the circulation of fluid, the control valve 1 has a first passage 616 and a second passage 617. One end of the first passage 616 extends through the first side wall portion 614 to form a first communication opening 6141 that is in communication with the first chamber 611, and the other end of the first passage 616 extends through the outer surface of the control valve 1 to form a first valve port, so that fluid may enter or exit the control valve 1 from the first valve port. One end of the second passage 617 extends through the second side wall portion 615 to form a second communication opening 6151 that is in communication with the second chamber 612, and the other end of the second passage 617 extends through the outer surface of the control valve 1 to form a second valve port, so that fluid can enter or exit the control valve 1 from the second valve port. In the control valve provided according to the embodiment of the present disclosure, by rotating the first valve core 62 and/or the second valve core 63, it is possible to realize multiple communication modes among several first valve ports and between the first valve port and the second valve port, and to realize the control function of the control valve 1 to the fluid.

Figure 5:
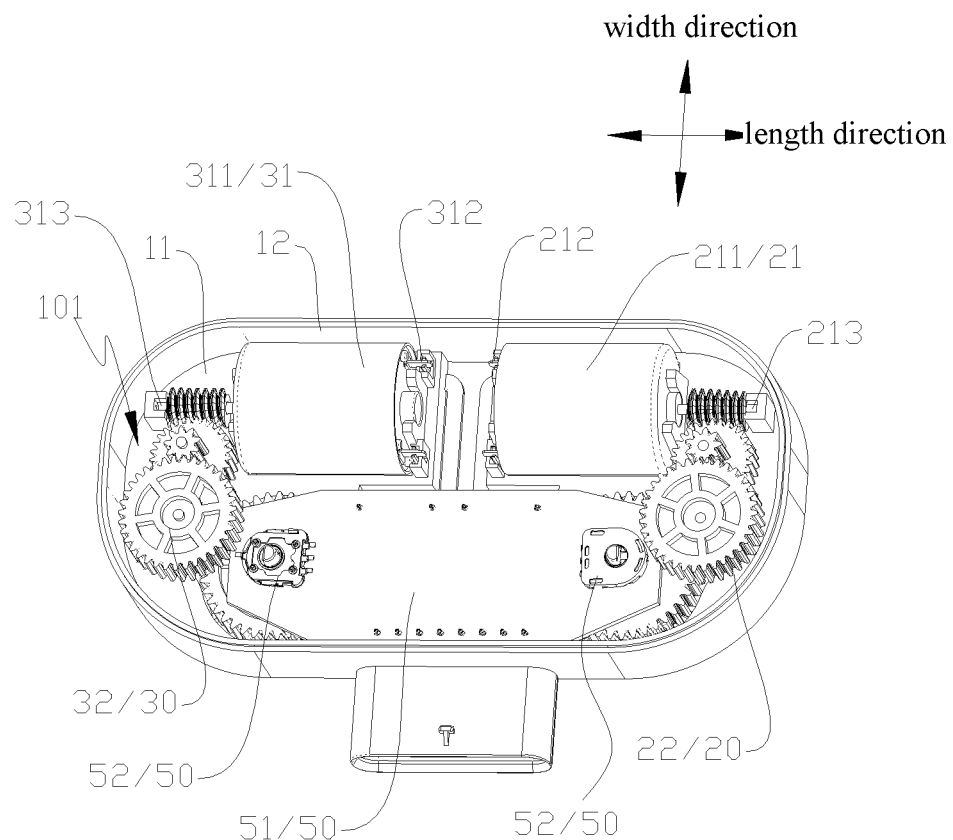
FIG. 5 is a partial schematic structural view of a driving device provided according to one embodiment of the present disclosure.

In order to drive the first valve core 62 and the second valve core 63 to rotate, as shown in FIG. 1 and FIG. 5, in the embodiment of the present disclosure, it also provides a driving device 100, which includes a housing 10 and a driving assembly, wherein the driving assembly includes a first driving assembly 20 and a second driving assembly 30, the driving device 100 has an accommodating cavity 101. The housing 10 includes a bottom wall portion 11 and a side wall portion 12 protruding from the bottom wall portion 11. The bottom wall portion 11 is a wall portion or at least a part of the wall portion of the accommodating cavity 101, and the side wall portion 12 is a peripheral wall or at least a part of the peripheral wall of the accommodating cavity 101. The main portion of an orthographic projection of each of the two ends of the side wall portion 12 on the bottom wall portion 11 is arcuate-shaped at two ends along the length direction of the driving device 100. Compared with rectangular orthographic projection or other complicated orthographic projection, the driving device 100 provided according to the embodiment of the present disclosure has a smaller size. At least part of the first driving assembly 20 and at least part of the second driving assembly 30 are located within the accommodating cavity 101. The first driving assembly 20 and the second driving assembly 30 are provided at an interval and arranged along the length direction of the driving device 100. The first driving assembly 20 includes a first motor 21, the first motor 21 includes a first body 211, a first power supply terminal 212 and a first output shaft 213. The first power supply terminal 212 is located at a first end of the first body 211 in a long-axis direction, the first output shaft 213 is located at a second end of the first body 211 in the long-axis direction. The second driving assembly 30 includes a second motor 31, the second motor 31 includes a second body 311, a second power supply terminal 312 and a second output shaft 313. The second power supply terminal 312 is located at a first end of the second body 311 in a long-axis direction, and the second output shaft 313 is located at a second end of the second body 311 in the long-axis direction. The first end of the first body 211 and the first end of the second body 311 are provided adjacent to each other and located between the second end of the first body 211 and the second end of the second body 311. In a specific implementation, the first motor 21 includes two first power supply terminals 212, which are a positive power supply terminal and a negative power supply terminal, respectively. The second motor 31 includes two second power supply terminals 312, which are a positive power supply terminal and a negative power supply terminal, respectively. The first power supply terminal 212 and the second power supply terminal 312 are provided adjacent to each other, and they are located between the first body 211 and the second body 311 along the length direction of the driving device. The first power supply terminal 212 and the second power supply terminal 312 are located between the first body 211 and the second body 311.

In conjunction with FIG. 5 to FIG. 9, in order to control the rotation of the first motor 21 and the second motor 31, the driving device 100 further includes multiple wire segments 401, which are electrically connected to the first power supply terminal 212 and the second power supply terminal 312 correspondingly. In this disclosure, the electrical connection between two components means that an electrical signal is able to be transmitted between the two components, and the two components may be electrically connected through direct contact with each other or via other conductive members.

In a specific implementation, the driving device 100 further includes four wire segments 401, which are electrically connected to the two first power supply terminals 212 of the first motor 21 and the two second power supply terminals 312 of the second motor 31 in one-to-one correspondence, so that the electric signal is transmitted to the corresponding power supply terminals via the wire segments 401. Each wire segment 401 includes a wiring segment 402 that is provided adjacent to the bottom wall portion 11, an extension direction of at least part of the wiring segment 402 intersects with the length direction of the driving device 100. Among the multiple wire segments 401, as making projection toward the bottom wall portion 11 along the height direction of the driving device 100, the orthographic projections of at least some of the wiring segments 402 at least partially overlap with the orthographic projection of the first body 211 and/or the orthographic projection of the second body 311. In that case, the width of a gap between the first body 211 and the second body 311 is less than the maximum width between the two wiring segments 402 along the length direction of the driving device 100. For example, in FIG. 7, the orthographic projection of one of the wiring segments 402 electrically connected to the first power supply terminal 212 on the bottom wall portion 11 overlaps with the orthographic projection of the first body 211 on the bottom wall portion 11, and the orthographic projection of one of the wiring segments 402 electrically connected to the second power supply terminal 312 on the bottom wall portion 11 overlaps with the orthographic projection of the second body 311 on the bottom wall portion 11. Compared with the case of arranging the four wiring segments 402 side by side within the gap between the first body 211 and the second body 311, it can effectively reduce the size of the gap between the first body 211 and the second body 311, and thus reduce the size of the driving device in the length direction, facilitating the miniaturization of the driving device.

Further referring to FIG. 5 to FIG. 9, in some embodiments, the driving device 100 further includes a control unit 50, wherein the control unit 50 and the driving assemblies are provided at an interval and arranged along the width direction of the driving device 100. Each wire segment 401 is electrically connected to the control unit 50. In conjunction with FIG. 5, FIG. 8 and FIG. 9, the first driving assembly 20 and the second driving assembly 30 are located at one end of the driving device 100 in the width direction. The control unit 50 is located at the other end of the driving device 100 in the width direction. The first power supply terminal 212 of the first motor 21 includes a first terminal T1 and a second terminal T2, one of the first terminal T1 and the second terminal T2 is a positive power supply terminal and the other is a negative power supply terminal. The second power supply terminal 312 of the second motor 31 includes a third terminal T3 and a fourth terminal T4, one of the third terminal T3 and the fourth terminal T4 is a positive power supply terminal and the other is a negative power supply terminal. Along the width direction of the driving device 100, the first terminal T1 is located between the second terminal T2 and the control unit 50, that is to say, the first terminal T1 is closer to the control unit 50 than the second terminal T2, and the third terminal T3 is located between the fourth terminal T4 and the control unit 50. The multiple wire segments 401 of the driving device 100 include a first wire segment 41 electrically connected to the first terminal T1, a second wire segment 42 electrically connected to the second terminal T2, and a third wire segment electrically connected to the third terminal T3, and a fourth wire segment 44 electrically connected to the fourth terminal T4. In conjunction with FIG. 7, FIG. 9 and FIG. 10, at least part of the wiring segment of the first wire segment 41 and at least part of the wiring segment of the third wire segment 43 are buried into the bottom wall portion 11. The wiring segment 402 of the second wire segment 42 and the wiring segment 402 of the fourth wire segment 44 are buried into the bottom wall portion 11 or protrude out from the bottom wall portion 11 and within the accommodating cavity 101. As making projection toward a bottom wall portion 11 along the height direction of the driving device 100, the orthographic projection of a first wiring segment 411 of the first wire segment 41 at least partially overlaps with the orthographic projection of the first body 211, the orthographic projection of a third wiring segment 431 of the third wire segment 43 at least partially overlaps with the orthographic projection of the second body 311, and the orthographic projection of a second wiring segment 421 of the second wire segment 42 and the orthographic projection of a fourth wiring segment 441 of the fourth wire segment 44 are located within a gap between the orthographic projection of the first body 211 and the orthographic projection of the second body 311.

Figure 10:
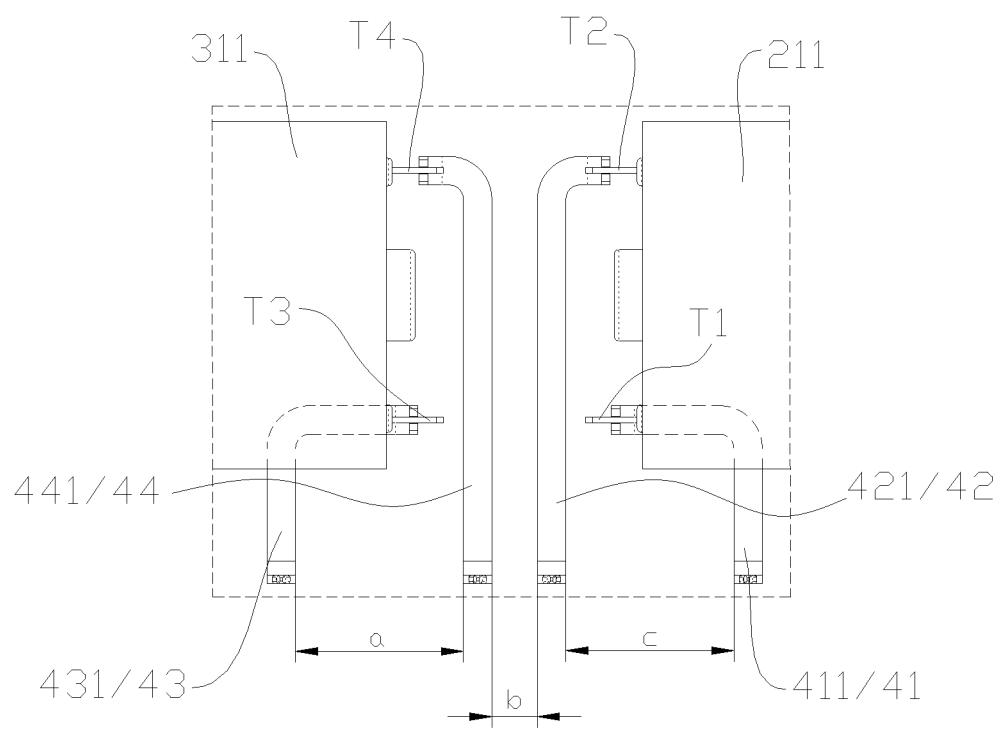
FIG. 10 is an enlarged structural schematic view of the zone Q in FIG. 9.

With further reference to FIG. 10, in some embodiments, the wiring segment of the first wire segment 41 is defined as the first wiring segment 411, the wiring segment of the second wire segment 42 is defined as the second wiring segment 421, the wiring segment of the third wire segment 43 is defined as the third wiring segment 431, and the wiring segment of the fourth wire segment 44 is defined as the fourth wiring segment 441. Along the length direction of the driving device 100, the first wiring segment 411, the second wiring segment 421, the fourth wiring segment 441 and the third wiring segment 431 are arranged in sequence, and the distance between two adjacent wiring segments 402 is greater than or equal to 2.6 mm. With said configuration, the signal interference between adjacent wire segments can be reduced, and the faults such as short-circuit of the line due to condensation within the driving device can also be improved.

Figure 8:
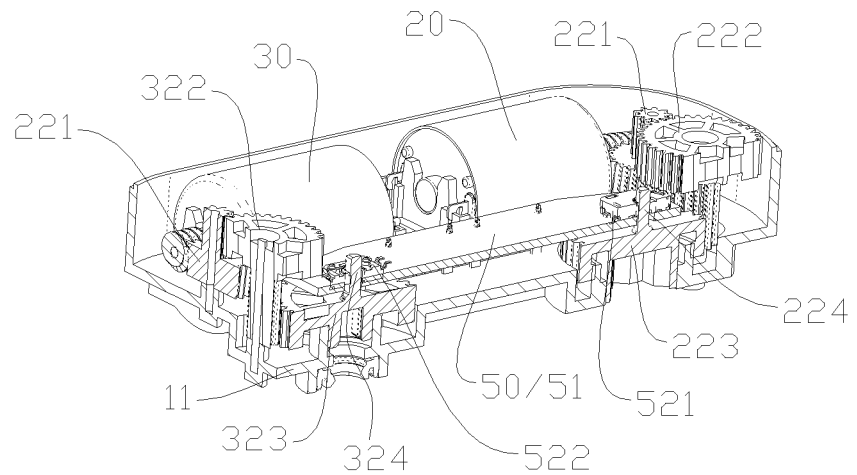
FIG. 8 is a schematic cross-sectional view of the driving device shown in FIG. 5 at a third position.
Figure 9:
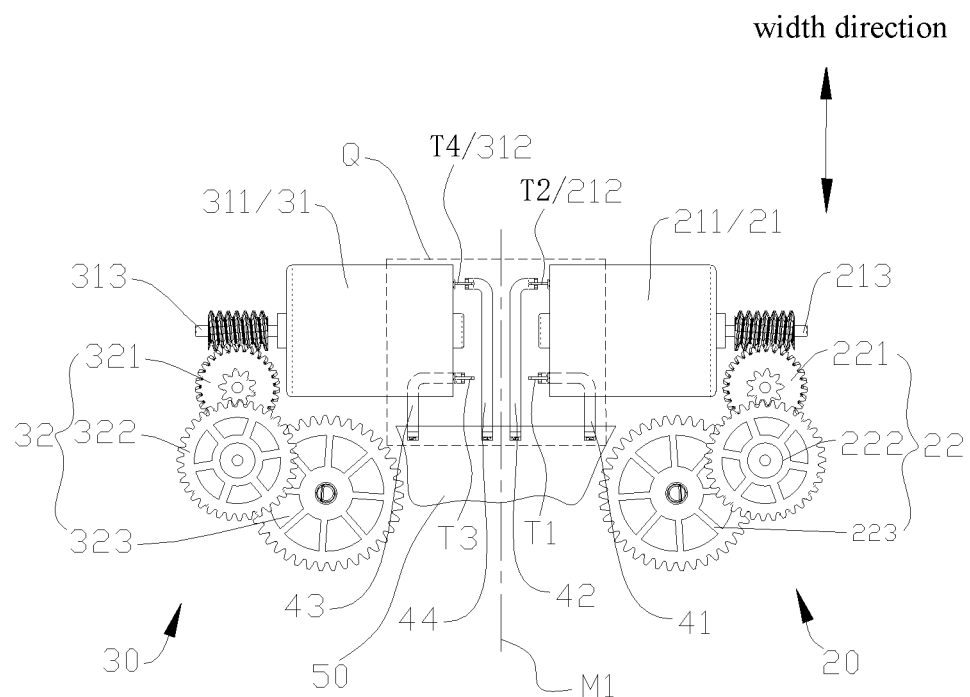
FIG. 9 is a front partial schematic view of a combined structure of the first drive assembly, the second drive assembly and the control unit provided according to one embodiment of the present disclosure.

Further referring to FIG. 5, FIG. 8 and FIG. 9, in some embodiments, as making projection toward the bottom wall portion 11 along the height direction of the driving device 100, the orthographic projection of the first driving assembly 20 and the orthographic projection of the second driving assembly 30 are provided symmetrically about a symmetry axis MI that extends along the width direction of the driving device 100. The structure of the first driving assembly 20 and the structure of the second driving assembly 30 are the same. The first motor 21 further includes a first output shaft 213 located at the second end of the first body 211, and the second motor 31 further includes a second output shaft 313 located at the second end of the second body 311. The first driving assembly 20 further includes a first transmission gear set 22, the first transmission gear set 22 can be in transmission connection with the first output shaft 213 by a worm. The second driving assembly 30 further includes a second transmission gear set 32, the second transmission gear set 32 may be in transmission connection with the second output shaft 313 by a worm. As making projection toward the bottom wall portion 11 along the height direction of the driving device 100, the orthographic projection of the control unit 50 overlaps with at least part of the orthographic projection of the first transmission gear set 22 and at least part of the orthographic projection of the second transmission gear set 32, respectively. With the above configuration, the size of the driving device 100 in the width direction can be reduced.

Figure 11:
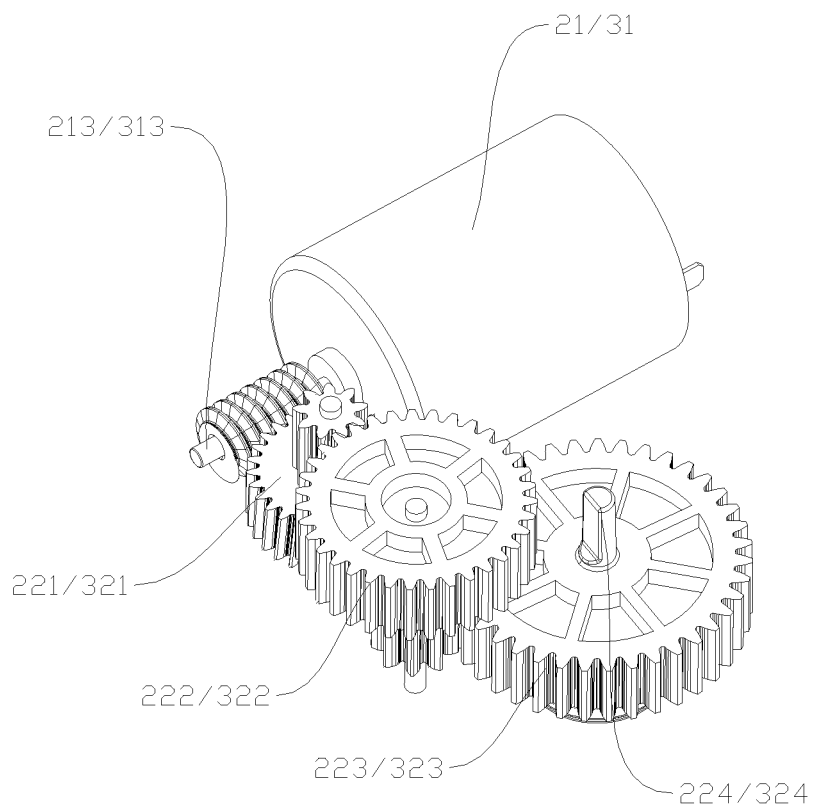
FIG. 11 is a schematic view of the three-dimensional structure of the first driving assembly and the second driving assembly provided according to one embodiment of the present disclosure.

As shown in FIG. 8, FIG. 9 and FIG. 11, in some embodiments, the first transmission gear set 22 includes a first output gear 223 and a first shaft 224 provided coaxially with the first output gear 223, the first shaft 224 is located on one side of the first output gear 223 away from the bottom wall portion 11. The second transmission gear set 32 includes a second output gear 323 and a second shaft 324 provided coaxially with the second output gear 323, the second shaft 324 is located on one side of the second output gear 323 away from the bottom wall portion 11. The first output gear 223 and the second output gear 323 are both located between the control unit 50 and the bottom wall portion 11. Both the first shaft 224 and the second shaft 324 pass through the control unit 50 and are position-limitedly arranged relative to the control unit 50, facilitating the position-limitation of the control unit 50.

Figure 6:
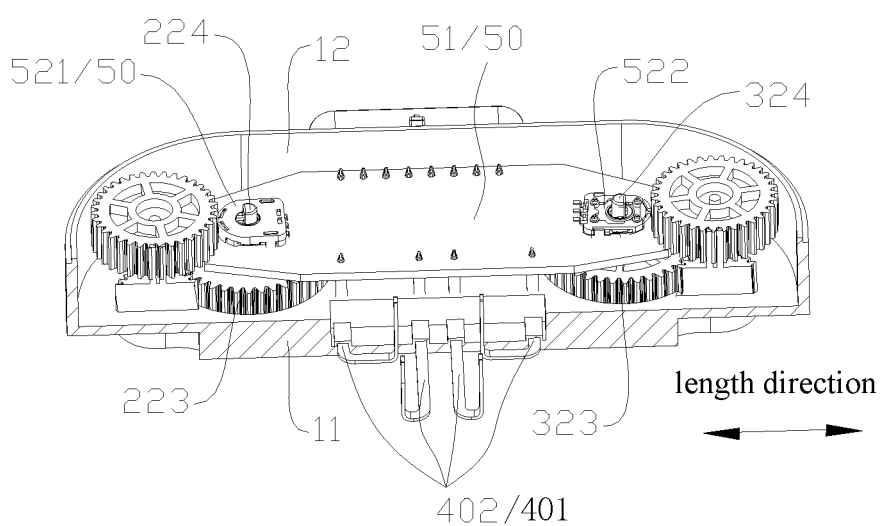
FIG. 6 is a schematic cross-sectional view of the driving device shown in FIG. 5 at a first position.
Figure 7:
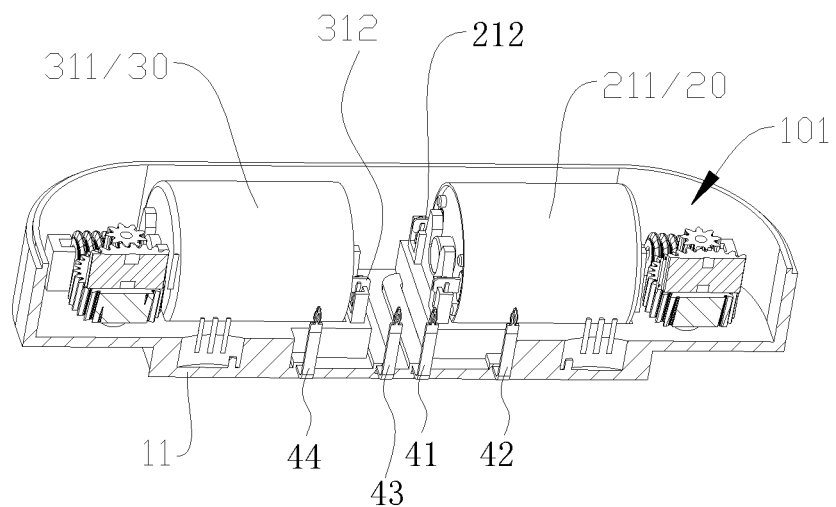
FIG. 7 is a schematic cross-sectional view of the driving device shown in FIG. 5 at a second position.

Further referring to FIG. 6 to FIG. 8, in some embodiments, the control unit 50 includes a control board 51, a first potentiometer 521 and a second potentiometer 522 that are fixedly connected to the control board 51. The first potentiometer 521 and the second potentiometer 522 are located on one side of the control board 51 away from the bottom wall portion 11. The first shaft 224 passes through the control board 51 and is sleeved within a limiting hole of the first potentiometer 521. The second shaft 324 passes through the control board 51 and is sleeved within a limiting hole of the second potentiometer 522. The limiting hole of the first potentiometer 521 and the limiting hole of the second potentiometer 522 may have a semicircular cross section, and the cross section of the first shaft 224 and the cross section of the second shaft 324 may also be semicircular. With the above configuration, a rotational sheet in the first potentiometer 521 rotates synchronously with the first shaft 224, and a rotational sheet in the second potentiometer 324 rotates synchronously with the second potentiometer 522, so as to monitor the rotation of the motor and the valve core in the control valve. Compared to providing a magnetic element on the worm and providing a Hall element on the control unit, the first potentiometer 521 and the second potentiometer 522 in the embodiment of the present disclosure may simplify the structure of the driving device and reduce the size of the driving device.

Figure 12:
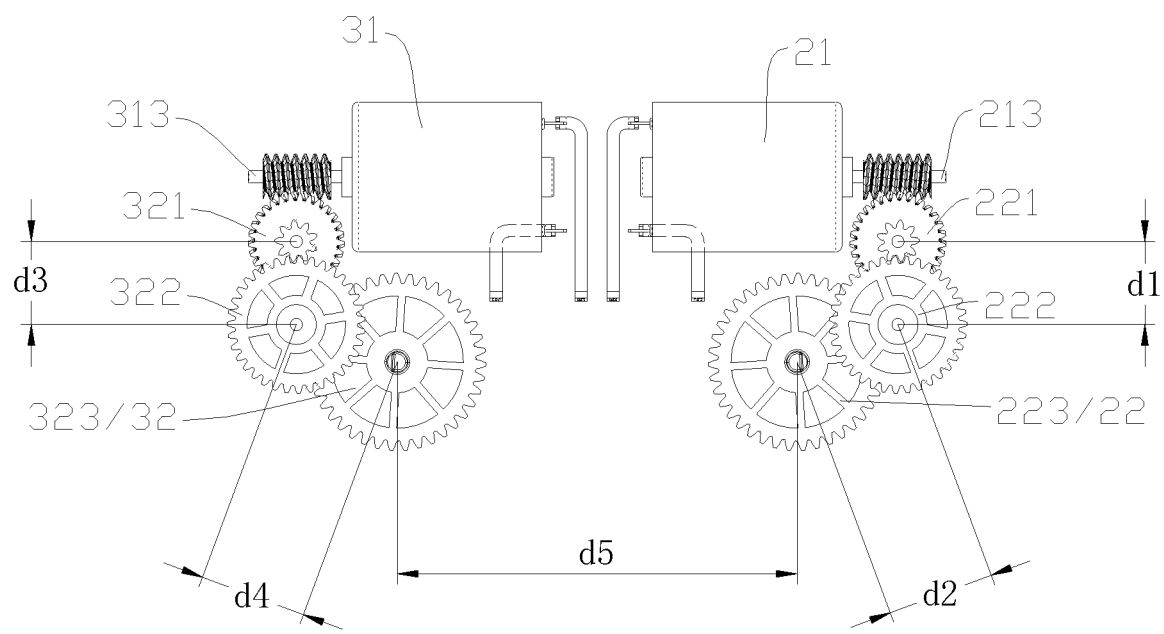
FIG. 12 is a front schematic structural view of the combined structure of the first driving assembly and the second driving assembly provided according to one embodiment of the present disclosure.

As shown in FIG. 11 and FIG. 12, in some embodiments, the first transmission gear set 22 further includes a first input gear 221 and a first intermediate gear 222, the first input gear 221 may be in transmission connection with the first output shaft 213 by a worm gear, and the first output gear 223 is in transmission connection with the first input gear 221 by the first intermediate gear 222. A center distance between the first input gear 221 and the first intermediate gear 222 is defined as d1, and a center distance between the first output gear 223 and the first intermediate gear 222 is defined as d2. The second transmission gear set 32 also includes a second input gear 321 and a second intermediate gear 322, the second input gear 321 is in transmission connection with the second output shaft 313, and the second output gear 323 is in transmission connection with the second input gear 321 by the second intermediate gear 322. A center distance between the second input gear 321 and the second intermediate gear 322 is defined as d3, a center distance between the second output gear 323 and the second intermediate gear 322 is defined as d4, and a center distance between the first output gear 223 and the second output gear 323 is defined as d5. Optionally, d1 may be 13.5 mm, d2 may be 17.5 mm, d3 may be 13.5 mm, d4 may be 17.5 mm, and d5 is less than or equal to 66 mm. With the above configuration, it enables the transmission gear set to stably transmit torque, and to reduce the center distance between the first output gear 223 and the second output gear 323, and reduce the size of the driving device 100. When the driving device 100 is applied to the control valve 1, in conjunction with FIG. 1 to FIG. 3, the control valve 1 provided according to the embodiment of the present disclosure can also reduce the distance between the first output gear 223 the first input shaft 223 and the second output gear 323 the second input shaft 323, as well as the distance between the first valve core 62 and the second valve core 63, thereby facilitating the miniaturization of the control valve. In addition, as further shown in FIG. 3, it can be understood that the control valve 1 further includes a first transmission shaft and a second transmission shaft, where the first valve core 62 is in transmission connection with the first output gear 223 by the first transmission shaft. In addition, the first valve core 62, the first output gear 223 and the first transmission shaft are arranged coaxially. Similarly, the second valve core 63, the second output gear 323 and the second transmission shaft are arranged coaxially.

In summary, the driving device 100 includes a first motor 21 and a second motor 31 that are provided at an interval, and the first end of the first motor 21 and the first end of the second motor 31 are provided adjacent to each other, so that the first power supply terminal 212 at the first end of the first motor 21 and the second power supply terminal 312 at the first end of the second motor 31 are provided adjacent to each other, facilitating a centralized wiring of multiple wire segments 401. By providing a projection toward the bottom wall portion 11 along the height direction of the driving device 100, the orthographic projections of at least some of the wiring segments 402 at least partially overlap with the orthographic projection of the first body 211 and/or the orthographic projection of the second body 311. Compared with the case of arranging all the wiring segments 402 within the gap between the first body 211 and the second body 311, according to the embodiment of the present disclosure, the number of wiring segments 402 arranged between the first body 211 and the second body 311 is reduced, the distance between the first body 211 and the second body 311 can be reduced, and the size of the driving device in the length direction can be further reduced. When the driving device is applied to the control valve 1, it can further reduce the size of the control valve 1, thereby realizing the miniaturization of the control valve 1, and facilitating the popularization and disclosure thereof.

It should be noted that the above embodiments are only used to illustrate the present disclosure and not limit the technical solutions described in the present disclosure, for example, the definition of directions such as "front", "rear", "left", "right", "upper", "lower". Although the present disclosure has been described in detail in the specification with reference to the above embodiments, those skilled in the art should understand that modifications, combinations or equivalent replacements can be made to the present disclosure by those skilled in the art, and all technical solutions and improvements thereof without deviating from the spirit and scope of the present disclosure shall fall within the scope of the claims of the present disclosure.

The invention claimed is:

1. A driving device, comprising a housing and a driving assembly, wherein the driving assembly comprises a first driving assembly and a second driving assembly, the driving device has an accommodating cavity, the housing comprises a bottom wall portion, the bottom wall portion is a wall portion or at least a part of the wall portion of the accommodating cavity; at least part of the first driving assembly and at least part of the second driving assembly are arranged in the accommodating cavity; a gap is provided between the first driving assembly and the second driving assembly, and the first driving assembly and the second driving assembly are arranged along a length direction of the driving device;

wherein the first driving assembly comprises a first motor, the first motor comprises a first body and a first power supply terminal located at a first end of the first body, and the second driving assembly comprises a second motor, the second motor comprises a second body and a second power supply terminal located at a first end of the second body;

wherein the driving device further comprises a plurality of wire segments that are electrically connected to the first power supply terminal and the second power supply terminal correspondingly, each wire segment comprises a wiring segment, and the extension direction of at least part of the wiring segment intersects with the length direction of the driving device;

wherein, among the plurality of wire segments, as making projection toward the bottom wall portion along a height direction of the driving device, the orthographic projections of at least some of the wiring segments are at least partially overlapped with the orthographic projection of the first body and/or the orthographic projection of the second body.

2. The driving device according to claim 1, wherein the first end of the first body is provided adjacent to the first end of the second body, and the width of the gap between the first body and the second body is less than the maximum width between two wiring segments along the length direction of the driving device.

3. The driving device according to claim 1, wherein the driving device further comprises a control unit, the control unit and the driving assembly are provided at an interval and arranged along the width direction of the driving device, and each wire segment is electrically connected to the control unit;

wherein the first power supply terminal of the first motor comprises a first terminal and a second terminal, and the second power supply terminal of the second motor comprises a third terminal and a fourth terminal; along the width direction of the driving device, the first terminal is located between the second terminal and the control unit, and the third terminal is located between the fourth terminal and the control unit;

wherein the wire segments of the driving device comprises a first wire segment electrically connected to the first terminal, a second wire segment electrically connected to the second terminal, a third wire segment electrically connected to the third terminal, and a fourth wire segment electrically connected to the fourth terminal;

wherein, as making projection toward the bottom wall portion along the height direction of the driving device, the orthographic projection of the wiring segment of the first wire segment at least partially overlaps with the orthographic projection of the first body, the orthographic projection of the wiring segment of the third wire segment at least partially overlaps with the orthographic projection of the second body, and the orthographic projection of the wiring segment of the second wire segment and the orthographic projection of the wiring segment of the fourth wire segment are located within a gap between the orthographic projection of the first body and the orthographic projection of the second body.

4. The driving device according to claim 3, wherein the wiring segment of the first wire segment and the wiring segment of the third wire segment are buried into the bottom wall portion, and the wiring segment of the second wire segment and the wiring segment of the fourth wire segment are buried into the bottom wall portion or protrude out from the bottom wall portion and in the accommodating cavity.

5. The driving device according to claim 4, wherein, as making projection toward the bottom wall portion along the height direction of the driving device, the orthographic projection of the first driving assembly and the orthographic projection of the second driving assembly are provided symmetrically about a symmetry axis that extends along the width direction of the driving device;

wherein the first motor further comprises a first output shaft located at a second end of the first body, the second motor further comprises a second output shaft located at a second end of the second body; the first driving assembly further comprises a first transmission gear set that is in transmission connection with the first output shaft, and the second driving assembly further comprises a second transmission gear set that is in transmission connection with the second output shaft;

wherein as making projection toward the bottom wall portion along the height direction of the driving device, the orthographic projection of the control unit is at least partially overlapped with at least part of the orthographic projection of the first transmission gear set and at least part of the orthographic projection of the second transmission gear set respectively.

6. The driving device according to claim 3, wherein, along the length direction of the driving device, the wiring segment of the first wire segment, the wiring segment of the second wire segment, the wiring segment of the fourth wire segment and the wiring segment of the third wire segment are arranged in sequence, and the distance between two adjacent wiring segments is greater than or equal to 2.6 mm.

7. The driving device according to claim 6, wherein, as making projection toward the bottom wall portion along the height direction of the driving device, the orthographic projection of the first driving assembly and the orthographic projection of the second driving assembly are provided symmetrically about a symmetry axis that extends along the width direction of the driving device;

wherein the first motor further comprises a first output shaft located at a second end of the first body, the second motor further comprises a second output shaft located at a second end of the second body; the first driving assembly further comprises a first transmission gear set that is in transmission connection with the first output shaft, and the second driving assembly further comprises a second transmission gear set that is in transmission connection with the second output shaft;

wherein as making projection toward the bottom wall portion along the height direction of the driving device, the orthographic projection of the control unit is at least partially overlapped with at least part of the orthographic projection of the first transmission gear set and at least part of the orthographic projection of the second transmission gear set respectively.

8. The driving device according to claim 3, wherein, as making projection toward the bottom wall portion along the height direction of the driving device, the orthographic projection of the first driving assembly and the orthographic projection of the second driving assembly are provided symmetrically about a symmetry axis that extends along the width direction of the driving device;

wherein the first motor further comprises a first output shaft located at a second end of the first body, the second motor further comprises a second output shaft located at a second end of the second body; the first driving assembly further comprises a first transmission gear set that is in transmission connection with the first output shaft, and the second driving assembly further comprises a second transmission gear set that is in transmission connection with the second output shaft;

wherein as making projection toward the bottom wall portion along the height direction of the driving device, the orthographic projection of the control unit is at least partially overlapped with at least part of the orthographic projection of the first transmission gear set and at least part of the orthographic projection of the second transmission gear set respectively.

9. The driving device according to claim 8, wherein the first transmission gear set comprises a first output gear and a first shaft provided coaxially with the first output gear, the first shaft is located on one side of the first output gear away from the bottom wall portion; the second transmission gear set comprises a second output gear and a second shaft provided coaxially with the second output gear, and the second shaft is located on one side of the second output gear away from the bottom wall portion; the first output gear and the second output gear are both located between the control unit and the bottom wall portion;

wherein the first shaft and the second shaft both pass through the control unit and are position-limitedly arranged relative with the control unit.

10. The driving device according to claim 9, wherein the control unit comprises a control board, and a first potentiometer and a second potentiometer that are fixedly connected to the control board, the first potentiometer and the second potentiometer are located on one side of the control board away from the bottom wall portion, the first shaft passes through the control board and is sleeved within a limiting hole of the first potentiometer, and the second shaft passes through the control board and is sleeved within a limiting hole of the second potentiometer.

11. The driving device according to claim 9, wherein the first transmission gear set further comprises a first input gear and a first intermediate gear, the first input gear is in transmission connection with the first output shaft, the first output gear is in transmission connection with the first input gear via the first intermediate gear; a center distance between the first input gear and the first intermediate gear is 13.5 mm, and a center distance between the first output gear and the first intermediate gear is 17.5 mm.

12. The driving device according to claim 11, wherein the second transmission gear set further comprises a second input gear and a second intermediate gear, the second input gear is in transmission connection with the second output shaft, and the second output gear is in transmission connection with the second input gear via the second intermediate gear; a center distance between the second input gear and the second intermediate gear is 13.5 mm, and a center distance between the second output gear and the second intermediate gear is 17.5 mm.

13. The driving device according to claim 12, wherein a center distance between the first output gear and the second output gear is less than or equal to 66 mm.

14. The driving device according to claim 9, wherein the housing further comprises a side wall portion protruding from the bottom wall portion, the side wall portion is a peripheral wall or at least a part of the peripheral wall of the accommodating cavity, and a main portion of the orthographic projection of each of the two ends of the side wall portion on the bottom wall portion is arcuate-shaped at two ends along the length direction of the driving device.

15. The driving device according to claim 1, wherein the housing further comprises a side wall portion protruding from the bottom wall portion, the side wall portion is a peripheral wall or at least a part of the peripheral wall of the accommodating cavity, and a main portion of the orthographic projection of each of the two ends of the side wall portion on the bottom wall portion is arcuate-shaped at two ends along the length direction of the driving device.

16. A control valve, wherein the control valve comprising a driving device according to claim 1, a valve body, a first valve core and a second valve core, wherein the valve body comprises a first chamber and a second chamber that are in communication with each other, and at least part of the first valve core is located in the first chamber and at least part of the second valve core is located in the second chamber, the first valve core is in transmission connection with the first driving assembly, and the second valve core is in transmission connection with the second driving assembly.

17. The control valve according to claim 16, wherein the first motor comprises a first output shaft, the first drive assembly further comprises a first transmission gear set that is in transmission connection with the first output shaft, the first transmission gear set comprises a first output gear; the second motor comprises a second output shaft, and the second drive assembly further comprises a second transmission gear set that is in transmission connection with the second output shaft, the second transmission gear set comprises a second output gear;

wherein the control valve comprises a first transmission shaft and a second transmission shaft, the first valve core is in transmission connection with the first output gear by the first transmission shaft;

the first valve core, the first transmission shaft and the first output gear are all coaxially provided; the second valve core, the second transmission shaft and the second output gear are all coaxially provided.

* * * * *